(12) United States Patent
Roy (10) Patent No.: US 7,043,533 B2
(45) Date of Patent: May 9, 2006

(54) METHOD AND APPARATUS FOR ARBITRATING MASTER-SLAVE TRANSACTIONS

(75) Inventor: Protip Roy, San Diego, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 707 days.

(21) Appl. No.: 10/008,349

(22) Filed: Dec. 6, 2001

(65) Prior Publication Data

US 2003/0110231 A1    Jun. 12, 2003

(51) Int. Cl.
*G06F 15/16*    (2006.01)

(52) U.S. Cl. ....................... 709/208; 709/211

(58) Field of Classification Search .......... 709/208–11, 709/209, 210, 211; 710/10
See application file for complete search history.

(56) References Cited

U.S. PATENT DOCUMENTS

| | | | | |
|---|---|---|---|---|
| 5,564,025 A | * | 10/1996 | De Freese et al. | 710/110 |
| 5,819,112 A | * | 10/1998 | Kusters | 710/36 |
| 5,996,036 A | * | 11/1999 | Kelly | 710/110 |
| 6,034,967 A | * | 3/2000 | Citta et al. | 370/443 |
| 6,256,634 B1 | * | 7/2001 | Moshaiov et al. | 707/100 |
| 6,260,174 B1 | * | 7/2001 | Van Loo | 714/811 |
| 6,321,307 B1 | | 11/2001 | Maguire et al. | |
| 6,345,345 B1 | | 2/2002 | Yu et al. | |
| 6,347,089 B1 | * | 2/2002 | Tsui et al. | 370/425 |
| 6,496,890 B1 | * | 12/2002 | Azevedo et al. | 710/110 |
| RE38,428 E | * | 2/2004 | Kelly et al. | 710/110 |
| 6,757,794 B1 | * | 6/2004 | Cabrera et al. | 711/156 |
| 6,782,439 B1 | * | 8/2004 | Kim | 710/110 |
| 6,807,593 B1 | * | 10/2004 | Moss et al. | 710/110 |
| 6,885,673 B1 | * | 4/2005 | Tzeng et al. | 370/412 |
| 6,886,048 B1 | * | 4/2005 | Richard et al. | 710/5 |
| 6,889,283 B1 | * | 5/2005 | Shah | 710/309 |

* cited by examiner

*Primary Examiner*—Krisna Lim
(74) *Attorney, Agent, or Firm*—Meyertons Hood Kivlin Kowert & Goetzel, P.C.; B. Noël Kivlin (57) ABSTRACT

The present invention provides a method and apparatus for arbitrating master-slave transactions. The apparatus includes a slave device adapted to receive a first request from a first master device. The apparatus further includes a record of one or more previous requests from the first master device and at least one additional master device, wherein the slave device is adapted to grant the first request based upon the record.

30 Claims, 6 Drawing Sheets

METHOD AND APPARATUS FOR ARBITRATING MASTER-SLAVE TRANSACTIONS

BACKGROUND OF THE INVENTION

1. Field of the Invention

This invention relates generally to processor-based systems, and, more particularly, to arbitrating master-slave transactions in processor-based systems.

2. Description of the Related Art

Businesses may use processor-based systems to simultaneously perform a wide variety of tasks. These tasks may include, but are not limited to, developing new software, maintaining databases of information related to operations and management, and hosting a web server that may facilitate communications with customers. To handle such a wide range of tasks, businesses may employ a processor-based system in which some or all of the processors may operate in a networked environment.

One example of a processor-based system used in a network-centric environment is a mid-range server system. A single mid-range server system may have a plurality of system boards that may, for example, contain one or more processors and one or more associated memory elements. A mid-range server system may also have a plurality of I/O boards that may support a range of I/O devices such as CD-ROMs, printers, scanners, and the like through one or more I/O cards. For example, one or more I/O boards in the mid-range server system may manage peripheral component interface cards and/or optical cards.

Devices supported by the plurality of system and I/O boards may exchange data. For example, data provided by a scanner may be written to one of the memory elements. Similarly, data that is stored in a memory element may be delivered to a printer. To facilitate the data exchange, the devices supported by the various system and I/O boards in a mid-range server system may be coupled to one or more buses, which may provide a data transfer pathway for the devices supported by the plurality of system and I/O boards in the system.

However, the bus may only support one data transaction between one pair of components at a given time. Thus, each device must request permission from a bus arbiter before the device may be allowed to transmit data along the bus. For example, in master/slave bus architectures, certain devices that are designated as masters may be able to request permission from the bus arbiter, which may determine whether or not a transaction is occurring on the bus. If the bus is not currently being used for a transaction, the bus arbiter may grant permission to the master, which may then send data along the bus to a slave device. The slave device generally includes a buffer to store the data and provide it to one of a plurality of devices that may be coupled to the slave device.

A plurality of master devices may be coupled to the bus and the requests from each master may not always arrive in a predictable order. To reasonably fairly distribute access to the bus among the plurality of master devices, the bus arbiter may implement a distribution algorithm such as a round-robin algorithm. In the round-robin algorithm, each master device may be associated with a position on a circle. When the bus arbiter grants permission to a first requesting master device, a pointer may be rotated to the position corresponding to the first requesting master device. Once the transaction is substantially complete, the bus arbiter may determine which master devices are currently requesting access to the bus. The bus arbiter may then rotate the pointer in a selected direction around the circle until it arrives at a position corresponding to a second requesting master device. The bus arbiter may then grant permission to the second requesting master device.

However, this method may occasionally break down. For example, the buffer of the slave device may become full after processing the first requesting master device's request and the slave device may take several clock cycles to complete emptying its buffer. In that time, the bus arbiter may grant permission to one or more second requesting master devices, which may attempt to send data to the slave. But the slave device may reject the requests from the one or more second requesting master devices. The slave may begin accepting requests once it has emptied its buffer, but by this time the pointer in the bus arbiter may have returned to the original requesting master, bypassing the others. Thus, one master device may repeatedly gain access to the slave device at the expense of other master devices. This may reduce the efficiency of the system and, in some cases, cause the system to crash.

SUMMARY OF THE INVENTION

In one aspect of the instant invention, an apparatus is provided for arbitrating master-slave transactions. The apparatus includes a slave device adapted to receive a first request from a first master device. The apparatus further includes a record of one or more previous requests from the first master device and at least one additional master device, wherein the slave device is adapted to grant the first request based upon the record.

In one aspect of the present invention, a method is provided for arbitrating master-slave transactions. The method includes receiving a request from one of a plurality of master devices. The method further includes granting the request based upon a record of a plurality of previous requests.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
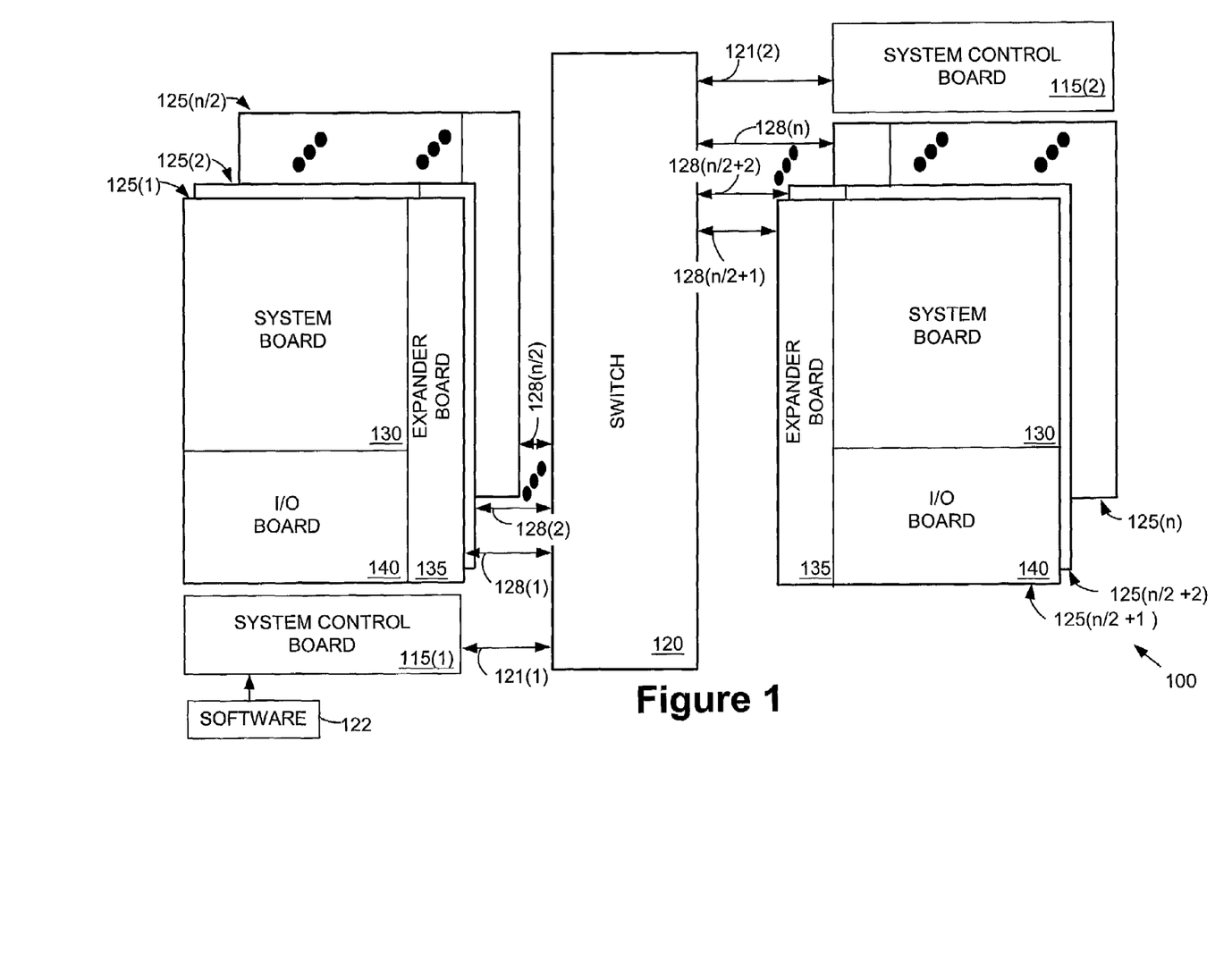
FIG. 1 shows a block diagram of a system in accordance with one embodiment of the present invention.

Referring now to FIG. 1, a block diagram of a system 100 in accordance with one embodiment of the present invention is illustrated. The system 100, in one embodiment, includes a plurality of system control boards 115(1–2) that are coupled to a switch 120. For illustrative purposes, lines 121(1–2) are utilized to show that the system control boards 115(1–2) are coupled to the switch 120, although it should be appreciated that, in other embodiments, the boards 115(1–2) may be coupled to the switch in any of a variety of ways, including by edge connectors, cables, or other available interfaces.

In the illustrated embodiment, the system 100 includes two control boards 115(1–2), one for managing the overall operation of the system 100 and the other to provide redundancy and automatic failover in the event that the other board fails. Although not so limited, in the illustrated embodiment, the first system control board 115(1) serves as a "main" system control board, while the second system control board 115(2) serves as an alternate replaceable system control board. In one embodiment, during any given moment, generally one of the two system control boards 115(1–2) actively controls the overall operations of the system 100.

The system 100, in one embodiment, includes a plurality of system board sets 125(1–n) that are coupled to the switch 120, as indicated by lines 128(1–n). The system board sets 125(1–n) may be coupled to the switch 120 in one of several ways, including edge connectors or other available interfaces. The switch 120 may serve as a communications conduit for the plurality of system board sets 125(1–n), half of which may be connected on one side of the switch 120 and the other half on the opposite side of the switch 120. The switch 120, in one embodiment, may be an 18×18 crossbar switch that allows system board sets 125(1–n) and system control boards 115(1–2) to communicate, if desired. Thus, the switch 120 may allow the two system control boards 115(1–2) to communicate with each other or with other system board sets 125(1–n), as well as allow the system board sets 125(1–n) to communicate with each other.

The system board sets 125(1–n) may, in one embodiment, comprise one or more boards, including a system board 130, an expander board 135, and an I/O board 140. The system board 130 may include processors, cache memories, and non-cache memories for executing, in one embodiment, applications, including portions of an operating system. The expander board 135, in one embodiment, generally acts as a multiplexer (e.g., 2:1 multiplexer) to allow both the system and I/O boards 130, 140 to interface with the switch 120, which, in some instances, may have only one slot for interfacing with both boards 130, 140.

The I/O board 140 may manage a plurality of I/O cards, such as peripheral component interface cards and optical cards, which are installed in the system 100. According to one embodiment of the present invention, each I/O card may be coupled to a shared bus and may function as a master to the shared bus. One or more slaves on the I/O board 140 may also be coupled to the shared bus and may be adapted to receive data from the shared bus and store the data in a buffer. To reasonably, efficiently, and fairly distribute access to the shared bus among the plurality of masters, a round-robin algorithm, described in more detail below, may be implemented by an arbiter on the I/O board 140. In one embodiment, the round-robin algorithm may be implemented to cycle periodically through a plurality of positions corresponding to the plurality of masters and examine each position. If information at the position indicates that the corresponding master is currently requesting access to the slave, the round-robin algorithm may grant the master access to the shared bus.

However, the slave buffer may become full and the slave may deny access to the master, even though the arbiter may have granted the request. For example, a first master may send 64 bytes of data to a slave, which may fill a 64-byte slave buffer. When the 64-byte slave buffer is full, the slave may not accept new transactions until the slave transmits the contents of the 64-byte slave buffer to another component of the system 100. During that time, the slave may deny any further requests from masters coupled to the shared bus even though the arbiter may grant permission to a master to transmit data along the shared bus.

The limited size of the slave buffer may cause the arbiter and the slave to produce an "arbitration harmonic," which refers to a state in which a minority of masters may complete a substantially greater number of transactions while a majority of masters complete a substantially smaller number of transactions. For example, if the 64-byte slave buffer becomes full, it will deny requests from masters for a certain time period while the slave empties the 64-byte slave buffer. During that time, the arbiter may continue to grant permission to various master devices using the round-robin algorithm. If the arbiter substantially completes one cycle in roughly the same time period required to empty the slave buffer, the slave may repeatedly grant access to substantially the same minority of masters and deny access to the corresponding majority of masters. Consequently, arbitration harmonics may reduce the efficiency of the system 100 because the majority of the plurality of masters may not be able to substantially complete transactions using the shared bus.

According to one embodiment of the present invention, the slave may comprise a least-recently-served (LRS) queue and a retry pool. The order of a plurality of elements in the LRS queue may reflect the order in which the plurality of masters may have previously completed transactions involving the slave. A plurality of positions in the retry pool may indicate which masters have been refused access to the slave because the slave was unable to complete a transaction. By preferentially granting access to masters that may have been refused access and/or masters that may not have been recently granted access to the slave, as indicated by the LRS queue and the retry pool, the slave may reduce the probability that an arbitration harmonic may be created and may thus increase the efficiency of the system 100.

Figure 2:
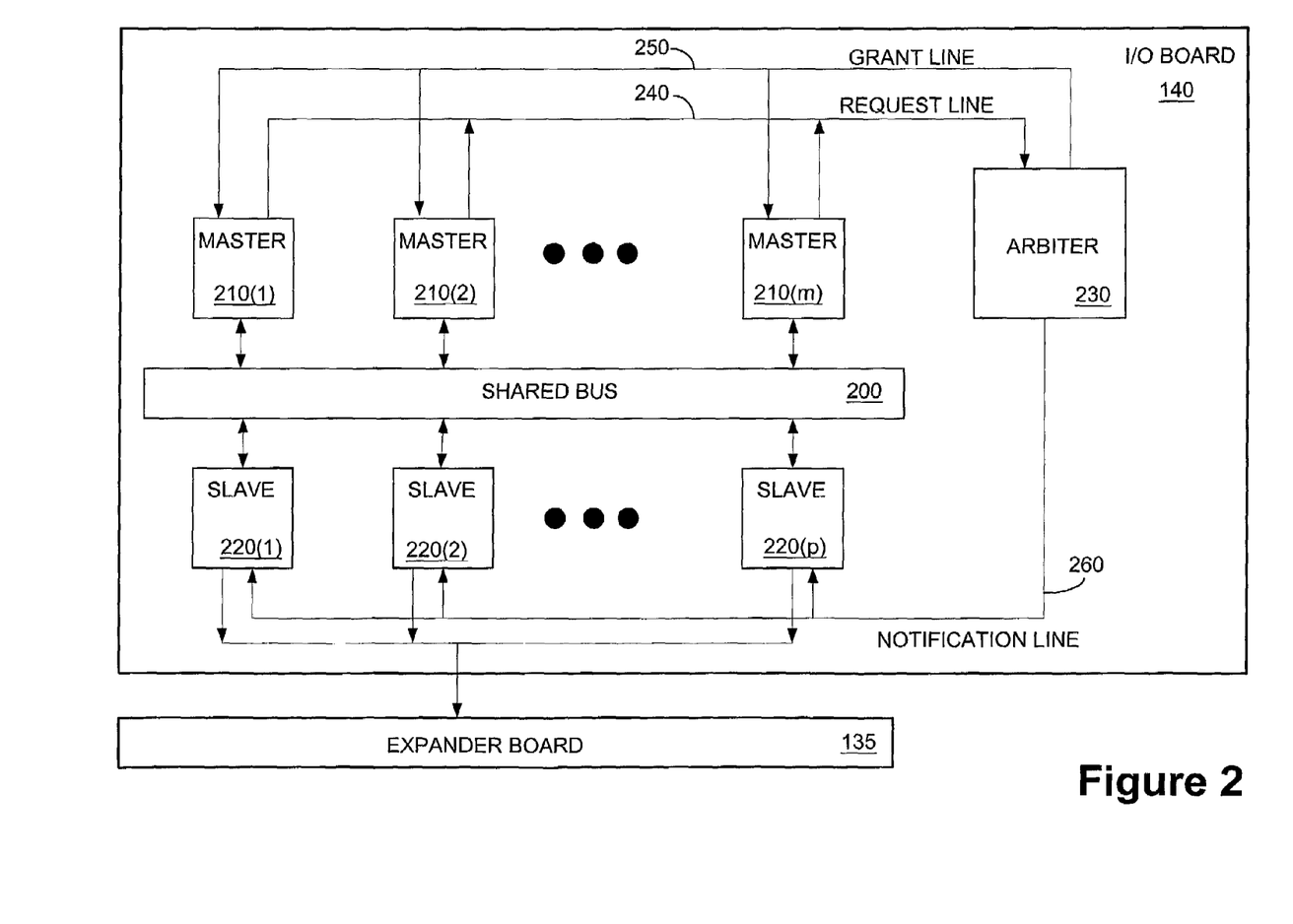
FIG. 2 shows a block diagram illustrating a shared bus that may be employed in the system shown in FIG. 1, in accordance with one embodiment of the present invention.

FIG. 2 shows a block diagram illustrating a shared bus 200 that may be employed on the I/O board 140, in accordance with one embodiment of the present invention. The shared bus 200 may be coupled to a plurality of masters 210(1–m) and a plurality of slaves 220(1–p). The masters 210(1–m) may be coupled to an arbiter 230 via a request line 240 and a grant line 250, and the slaves 220(1–p) may be coupled to the arbiter 230 via a notification line 260. The shared bus 200 may provide a pathway to transmit signals from one of the plurality of masters 210(1–m) to one of the plurality of slaves 220(1–p) and, in one embodiment, one master-slave pair may exchange data along the shared bus 200 at a given time. Those skilled in the art will appreciate that a single device may operate at different times as a master or a slave. However, for purposes of illustration, the devices 210(1–m), 220(1–p) coupled to the shared bus 200 have been described as functioning only as a master 210 (1–m) or a slave 220(1–p).

A variety of devices may serve as masters 210(1–m) on the I/O board 140. For example, in one embodiment, the masters 210(1–m) may include device drivers for printers, scanners, and other I/O devices. The masters 210(1–m) may further include controllers for managing one or more PCI cards. The masters 210(1–m) may submit requests to use the shared bus 200 by transmitting a signal along the request line 240 to the arbiter 230. The arbiter 230 may receive one or more requests from a plurality of masters 210(1–m) and may use a round-robin algorithm to grant one or more requests. The arbiter 230 may notify the selected master 210(1–m) by transmitting a signal along the grant line 250. When the arbiter 230 grants one of the plurality of masters 210(1–m) permission to use the shared bus 200, the master 210(1–m) may transmit data via the shared bus 200 to one of the plurality of slaves 220(1–p). The slave 220(1–p) may then store the data and/or transmit the data to the expander board 135.

Figure 3:
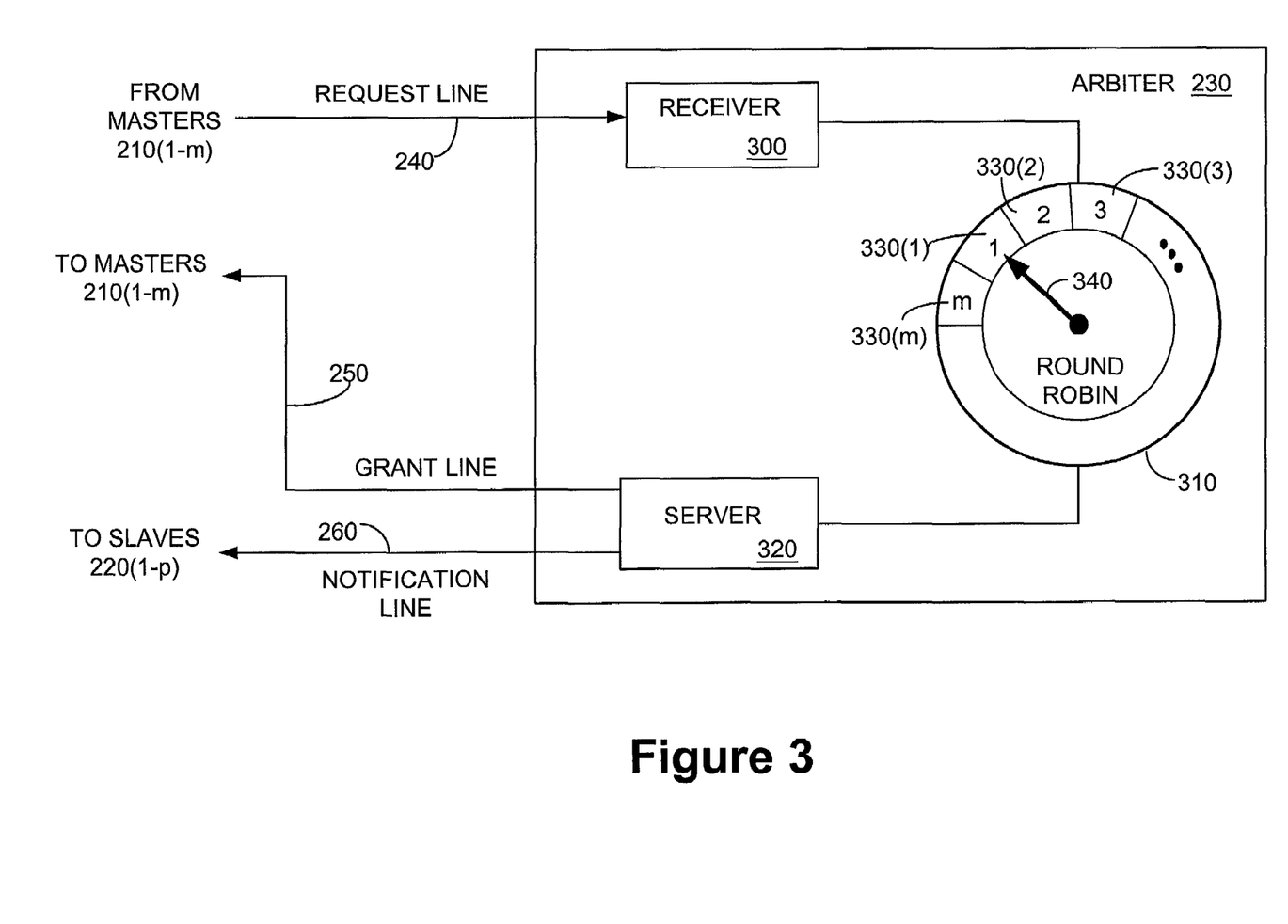
FIG. 3 shows a block diagram illustrating an arbiter that may be used by the shared bus shown in FIG. 2, in accordance with one embodiment of the present invention.

Referring now to FIG. 3, a block diagram of the arbiter 230 in accordance with one embodiment of the present invention is shown. Requests from the masters 210(1–m) to use the shared bus 200 may be transmitted to the arbiter 230 along the request line 240 and received by a receiver 300. The arbiter 230 may further comprise a round-robin 310 that may be coupled to a server 320. The server 320 may be adapted to transmit signals to the masters 210(1–m) via the grant line 250 and to the slaves 220(1–p) via the notification line 260.

In one embodiment, the round-robin 310 may comprise a set of positions 330(1–m). Each of the positions 330(1–m) may correspond to one of the plurality of masters 210(1–m), as indicated in FIG. 3 by the symbols "1," "2," "3," and "m." The positions 330(1–m) may be adapted to indicate whether or not the corresponding master 210(1–m) has submitted a request to use the shared bus 200. For example, if the master 210(1–m) has submitted a request to the arbiter 230, a logical element (not shown) at the position 330(1) may be set to logic-high. The round-robin 310 may also include a pointer 340 adapted to point to one of the plurality of positions 330(1–m). In one embodiment, the pointer 340 may be adapted to point to the position 330(1–m) corresponding to the last master 210(1–m) to be granted a request to use the shared bus 200. The pointer 340 may also, in one embodiment, be adapted to move counter-clockwise. In an alternative embodiment, the pointer 340 may be adapted to move clockwise.

For ease of illustration, the round-robin 310 has been depicted in FIG. 3 as a circular arrangement of positions 330(1–m) including a pointer 340 that may rotate about the center of the positions 330(1–m). It should, however, be appreciated that the positions 330(1–m) may not necessarily take the form of a circle. For example, the round-robin 310 may include a linear arrangement of positions 330(1–m) that may be sequentially accessed by the pointer 340 in a manner well known to those of ordinary skill in the art. It should be appreciated that the form of the arbiter 230 is not material to this invention and so, in alternative embodiments, other forms may be chosen without departing from the scope of the present invention.

Figure 4:
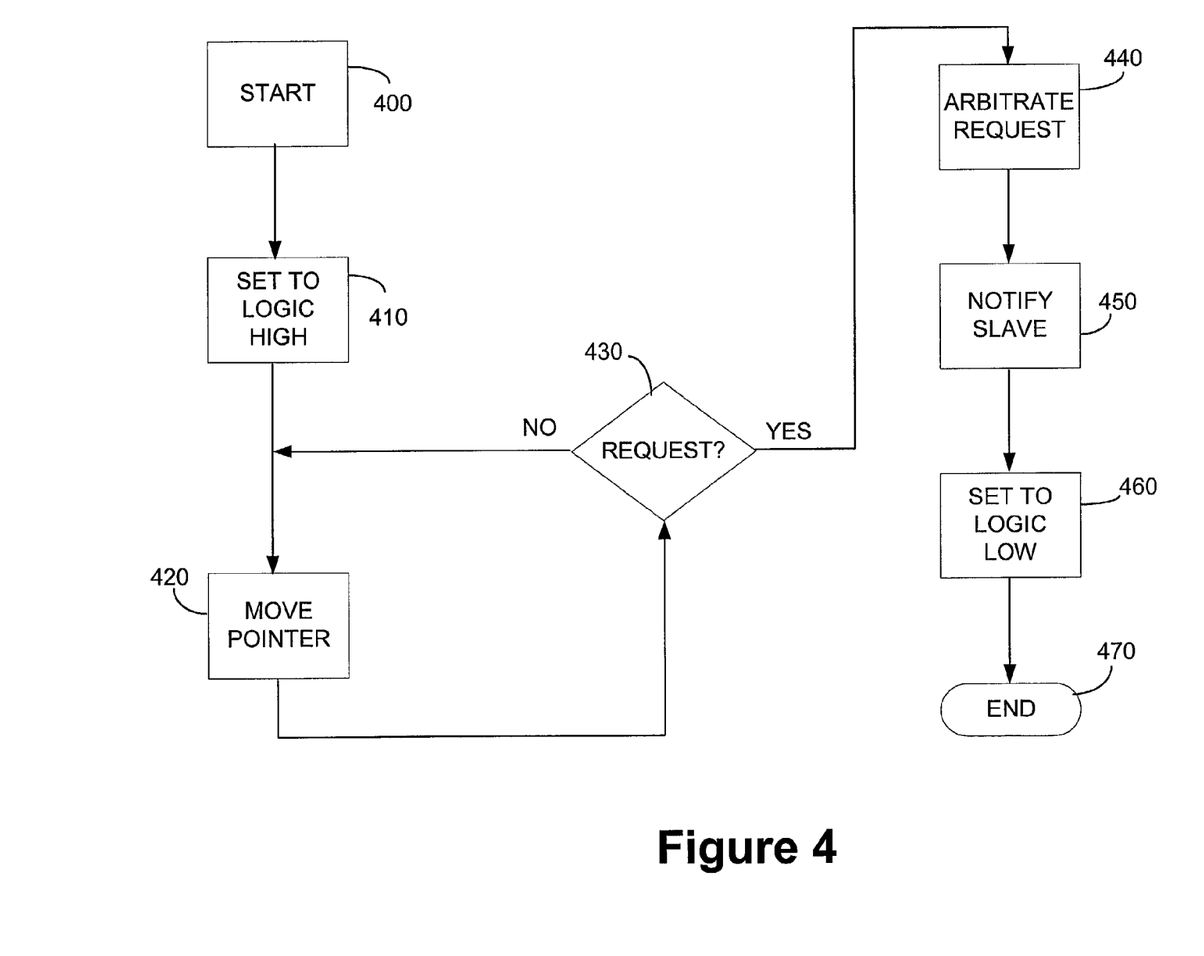
FIG. 4 shows a flow chart that illustrates a method of arbitrating requests from a plurality of masters to the arbiter shown in FIG. 3, in accordance with one embodiment of the present invention.

FIG. 4 shows a flow chart illustrating a method of arbitrating requests from the plurality of masters 210(1–m), in accordance with one embodiment of the present invention. The receiver 300 in the arbiter 230 may start (at 400) the arbitration sequence by querying each of the masters 210(1–m) to determine whether they may be submitting a request. For example, the shared bus 200 may be capable of transmitting one transaction at a time, so the arbiter may start (at 400) the arbitration sequence when the previous bus transaction is substantially complete. If no requests from the masters 210(1–m) are pending, the arbiter 230 may not start (at 400) the arbitration sequence.

If at least one master 210(1–m) is making a request, the receiver 300 may then set (at 410) to logic-high the at least one position 330(1–m) in the round-robin 310 that corresponds to each of the requesting masters 210(1–m). Once the storage elements in the plurality of positions 330(1–m) have been substantially set (at 410), the round-robin 310 may move (at 420) the pointer 340 to the next position 330(1–m). In one embodiment, the next position 330(1–m) may be reached by rotating the pointer 340 in the clockwise direction. For example, if the pointer 340 was pointing to position 330(1), as indicated in FIG. 3 by a "1," moving (at 420) the pointer 340 would bring it to position 330(2), indicated in FIG. 3 by a "2." In an alternative embodiment, the next position 330(1–m) may be reached by rotating the pointer 340 in the counter-clockwise direction. For example, if the pointer 340 was pointing to position 330(1), as indicated in FIG. 3 by a "1," moving (at 420) the pointer 340 in a counter-clockwise direction would bring it to position 330 (m), indicated in FIG. 3 by an "m."

If the server 320 determines (at 430) that the storage element in the position 330(1–m) pointed to by the pointer 340 is set to logic-low, indicating that the corresponding master 210(1–m) has not made a request, the pointer 340 may move (at 420) to the next position 330(1–m). The arbiter 230 may repeat this sequence until the server 320 determines (at 430) that the storage element in the position 330(1–m) pointed to by the pointer 340 is set to logic-high, indicating that the corresponding master 210(1–m) has made a request to use the shared bus 200. The server 320 may then arbitrate (at 440) the request as described above and transmit a signal via the grant line 250 to notify (at 450) the master 330(1–m) that the request to use the shared bus has been granted. If more than one master 210(1–n) made a request, the server 320 may also transmit a signal via the grant line 250 to notify (at 450) the remaining masters 330(1–m) that their requests to use the shared bus have been denied.

According to one embodiment of the present invention, upon granting (at 440) the request, the server 320 may also transmit a signal via the notification line 260 to notify (at 450) the appropriate slave 220(1–p) that one of the plurality of masters 210(1–m) has been granted permission to use the shared bus 200. The transmitted signal may, in one embodiment, include an identification number that may be used by the slave 220(1–p) to identify the requesting master 210(1–m). The round-robin 310 may then set (at 460) the storage element at the position 330(1–m) corresponding to the served master 210(1–m) to logic-low and end (at 470) the granting sequence.

In the preceding discussion of FIG. 4, setting the storage elements at the positions 330(1–n) of the round-robin 310 to logic-high is presumed to indicate that the corresponding master 210(1–m) may have made a request to the arbiter 230. Setting the storage elements to logic-low, on the other hand, has been presumed to indicate that the corresponding master 210(1–m) may not have made a request to the arbiter 230. However, it will be appreciated by those of ordinary skill in the art that the association of logic-high with a request from a master 210(1–m), and the association of logic-low with the absence of a request from a master 210(1–m), are design choices that do not materially affect the present invention. For example, in an alternative embodiment, logic-low could be chosen to indicate that a master 210(1–m) may have made a request to the arbiter 230.

Figure 5:
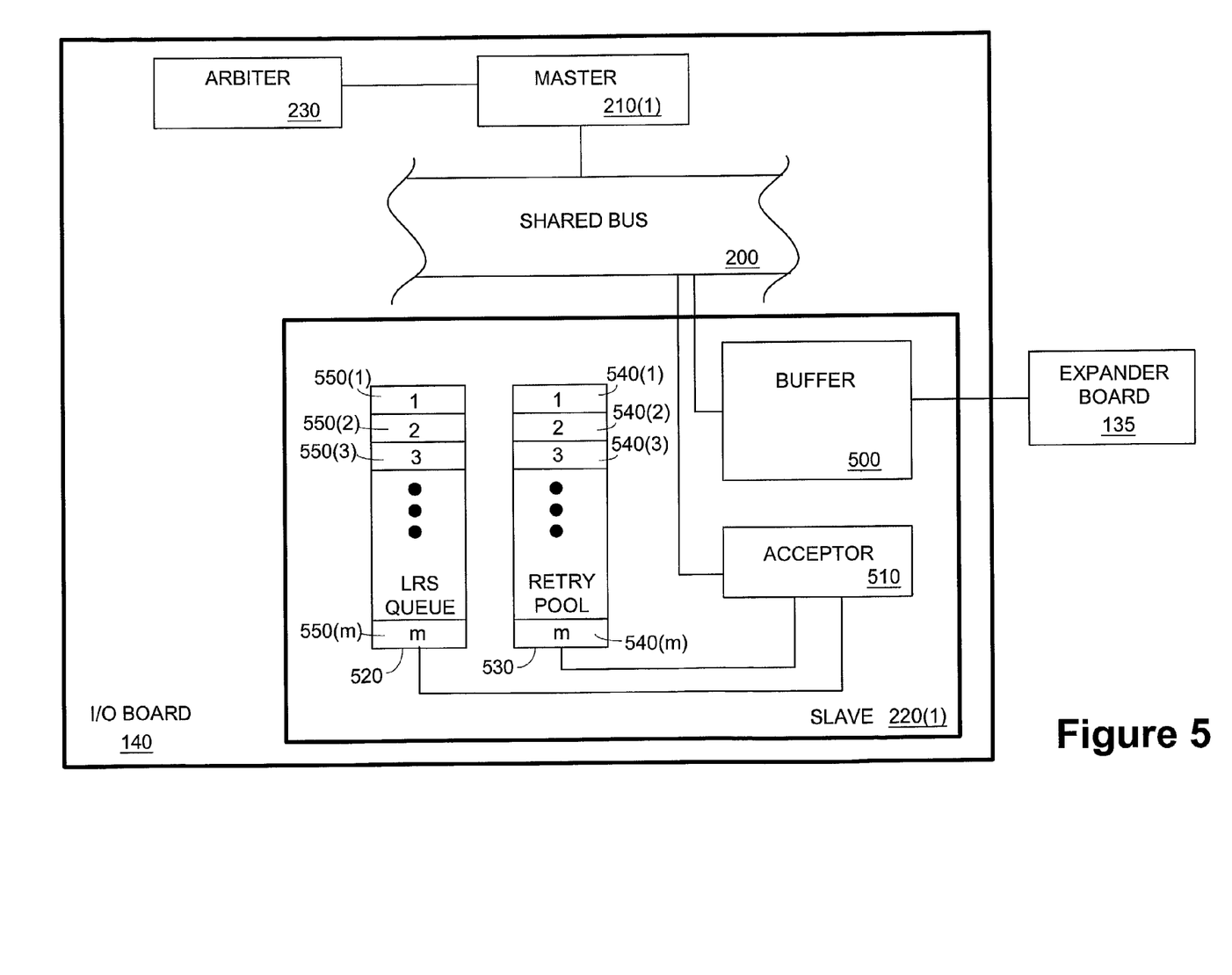
FIG. 5 shows a block diagram of a slave device that may be used on the I/O board of the system shown in FIG. 1, in accordance with one embodiment of the present invention.

FIG. 5 shows a block diagram of a slave 220(1) that may be used on the I/O board 140, in accordance with one embodiment of the present invention. Although not so limited, the slave 220(1) may include a buffer 500, an acceptor 510, a least-recently-served (LRS) queue 520, and a retry pool 530. The buffer 500 may be coupled to the shared bus 200 and may be adapted to receive data transmitted from the master 210(1) via the shared bus 200. For example, the buffer 500 may include a 64-byte memory element. The acceptor 510 may also be coupled to the shared bus 200 and the buffer 500. If the buffer 500 is not substantially full, the acceptor 510 may accept requests to transmit data from the master 210(1) to the buffer 500 in the slave 220(1). In the event that the buffer 500 may be substantially full when the master 210(1) receives permission to transmit data via the shared bus 200 from the arbiter 230, the acceptor 510 may deny access to the master 210(1) until the slave 220(1) has substantially cleared the buffer 500. For example, the slave 220(1) may transmit the contents of the buffer 500 to the expander board 135.

On occasion, the normal operation of the arbiter 230 and the slave 220(1) may produce an arbitration harmonic that may reduce the efficiency of the system 100 by repeatedly granting access to a minority of the plurality of masters 210(1–m) and repeatedly denying access to a majority of the plurality of masters 210(1–m). For example, if the buffer 500 becomes full while processing a request from the master 210(1), it may deny further requests while the slave 220(1) empties the buffer 500. If the time required to empty the buffer 500 corresponds approximately to the time it takes for the arbiter 230 to complete a cycle through the positions 330(1–m) of the round-robin 310, the slave 220(1) may again grant access to the same master 210(1), even though the arbiter 230 may have previously granted access to one or more masters 210(1–m).

According to one embodiment of the present invention, the retry pool 530 may comprise a storage device having a plurality of positions 540(1–m) corresponding to the masters 210(1–m), as indicated by the symbols "1," "2," "3," and "m" in FIG. 5. The storage device may take the form of registers, queues, and the like. The positions 540(1–m) may include a storage element (not shown) that may be set to logic-high when the acceptor 510 denies a request from the corresponding master 210(1–m) and set to logic-low when the acceptor 510 accepts a request. The LRS queue 520 may include a plurality of elements 550(1–m) equal to the number of masters 210(1–m) coupled to the shared bus 200. In one embodiment, the LRS queue 520 may take the form of a linked list of the elements 550(1–m). The acceptor 510 may instruct the LRS queue 520 to move the corresponding element 550(1–m) to the bottom of the list when the acceptor 510 grants a request from a master 210(1–m). For example, the elements 550(1–m) in the LRS queue 520 may be ordered sequentially from top to bottom, i.e. in the order "1," "2," ... "m." If the acceptor 510 grants a request to the master 210(1), the LRS queue 520 may be re-ordered to place the corresponding element 550(1) at the bottom of the list, i.e. in the order "2," ..., "m," "1."

Figure 6:
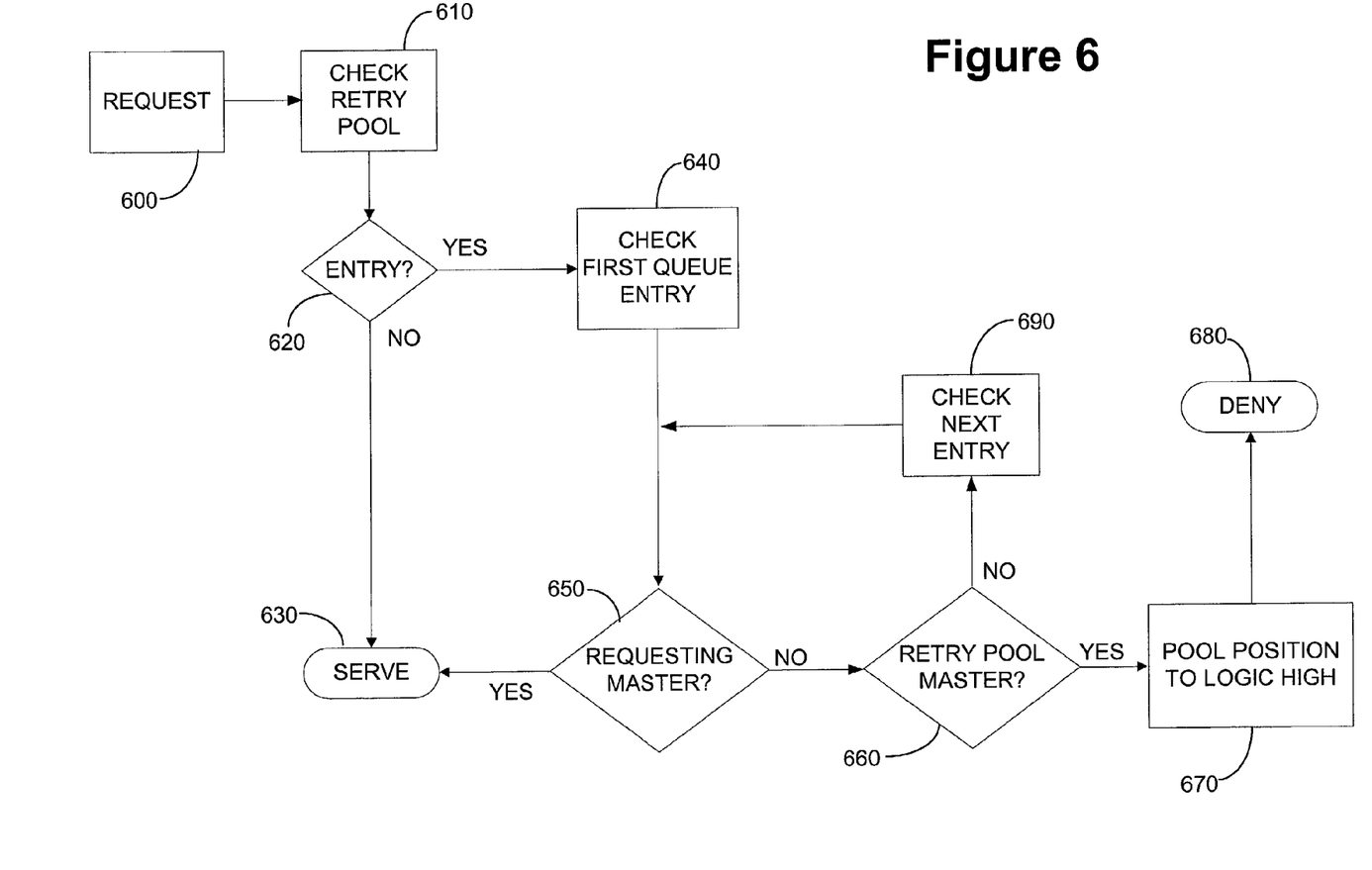
FIG. 6 shows a flow chart illustrating a method of accepting or denying requests to the slave device shown in FIG. 5, in accordance with one embodiment of the present invention.

FIG. 6 shows a flow chart illustrating a method of accepting or denying requests to one of the plurality of slaves 220(1–p), in accordance with one embodiment of the present invention. In the interest of clarity and to maintain consistency with FIG. 5, the following discussion will refer to the particular master 210(1) and the particular slave 220(1). It should, however, be appreciated the following discussion applies equally to any pair of masters 210(1–m) and slaves 220(1–p), and that the choice of the master 210(1) and the slave 220(1) in the following discussion in no way limits the scope of the present invention.

The slave 220(1) may receive (at 600) a request for a transaction from one of the plurality of masters 210(1–m), which in this discussion will be designated as the master 210(1), as discussed above. Although not so limited, the requested transaction may include writing information to the buffer 500 or reading information from the buffer 500. According to one embodiment of the present invention, the acceptor 510 on the slave 220(1) may check (at 610) the positions 540(1–m) of the retry pool 530. If the acceptor 510 determines (at 620) that substantially all of the storage elements at the positions 540(1–m) have been set to logic-low, indicating that substantially all of the masters 210(1–m) have had their most recent request to the slave 220(1) accepted, the acceptor 510 may serve (at 630) the requesting master's 210(1) request. If, on the other hand, the acceptor 510 determines (at 620) that at least one of the storage elements at the positions 540(1–m) has been set to logic-high, indicating that at least one of the masters 210(1–m) have had their most recent request to the slave 220(1) denied, the acceptor 510 may examine (at 640) the first element 550(1–m) in the LRS queue 520.

According to one embodiment of the present invention, if the acceptor 510 determines (at 650) that the first element 550(1–m) corresponds to the requesting master 210(1), e.g. the top of the LRS queue 520 contains the element 550(1) indicated by the symbol "1," then the requesting master 210(1) may be the least recently served of the plurality of masters 210(1–m) and the acceptor 510 may serve (at 630) the request. On the other hand, if the acceptor 510 determines (at 650) that the first element 550(1–m) does not correspond to the requesting master 210(1), e.g. the top of the LRS queue 520 does not contain the element 550(1) indicated by the symbol "1," the acceptor 510 may then examine (at 660) the retry pool 530. If the storage element at the position 540(1–m) corresponding to the first element 540(1–m) has been set to logic-high, indicating that the respective master 210(1–m) may have had its last request denied by the slave 220(1), the acceptor 510 may then set (at 670) the storage element at the position 540(1) in the retry pool 530 to logic-high and deny (at 680) the request from the master 210(1).

If the storage element at the position 540(1–m) corresponding to the first element 540(1–m) has been set to logic-low, indicating that the respective master 210(1–m) may not have had its last request denied by the slave 220(1), the acceptor 510 may continue (at 690) to the next entry in the LRS queue 520. Following the algorithm described in detail above, the acceptor 510 may then determine (at 650 and at 660) whether the current entry corresponds to the requesting master 210(1) or to a master 210(1–m) that may have had its last request denied by the slave 220(1). If the acceptor 510 encounters the requesting master 210(1) substantially before it encounters a recently denied master 210(1–m), the acceptor 510 may serve (at 630) the request. On the other hand, if the acceptor 510 encounters a recently denied master 210(1–m) substantially before it encounters the requesting master 210(1), the acceptor 510 may set (at 670) the storage element at the position 540(1) in the retry pool 530 to logic-high and deny (at 680) the request from the master 210(1).

In the preceding discussion of FIG. 6, setting the storage elements at the positions 540(1–m) of the retry pool 530 to logic-high is presumed to indicate that the corresponding master 210(1–m) may have had a previous request denied by the slave 220(1). Setting the storage elements to logic-low, on the other hand, has been presumed to indicate that a previous request by the corresponding master 210(1–m) has not been denied by the slave 220(1). However, it will be appreciated by those of ordinary skill in the art that the association of logic-high with a denied request from a master 210(1–m), and the association of logic-low with the absence of a denied request from a master 210(1–m), are design choices that do not materially affect the present invention. For example, in an alternative embodiment, logic-low could be chosen to indicate that a master 210(1–m) may have had a request denied by the slave 220(1).

In accordance with one embodiment of the present invention, providing the LRS queue 520 and the retry pool 530 may reduce the probability of generating arbitration harmonics in the system 100. By giving priority to masters 210(1–m) that may have had a previous request denied by the slave 220(1–p) and may not have been served recently by the slave 220(1–p), as described in detail above, requests from masters 210(1–m) may be arbitrated more fairly and the overall efficiency of the system 100 improved.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus comprising:
a slave device adapted to receive a first request from a first master device; and
a record of one or more previous requests from the first master device and at least one additional master device, wherein the record includes a storage configured to indicate which of the first master device and the at least one addition master device has had a previous request denied and a queue configured to indicate an order in which the first master device and the at least one additional master device were granted a request by the slave, wherein the slave device is configured to grant the first request if the storage and queue indicate that the first master is a least recently served master device of one or more master devices that has had a previous request denied by the slave device.

2. The apparatus of claim 1, wherein the slave device is configured to arrange the elements in the queue to indicate the order in which the slave device granted the one or more previous requests from the first and the at least one additional master device.

3. The apparatus of claim 2, wherein the storage is a retry pool including a plurality of positions each corresponding to one of a plurality of master devices coupled to the slave device, the plurality of master devices including the first master device and the at least one additional master device.

4. The apparatus of claim 3, wherein each of the plurality of positions in the retry pool comprise a storage element.

5. The apparatus of claim 4, wherein the slave device is adapted to set the storage element at one or more positions of the retry pool to indicate whether the slave device has denied the one or more previous requests from the plurality of master devices.

6. The apparatus of claim 5, wherein the slave device is adapted to grant the first request based upon the order of the elements in the queue and the state of the storage elements at the positions in the retry pool.

7. The apparatus of claim 6, wherein the slave device is configured to determine whether the slave device has denied the previous request from one or more of the plurality of master devices by examining the storage.

8. The apparatus of claim 7, wherein the slave device is configured to grant the first request if the storage indicates that none of the plurality of master devices have had a previous request denied.

9. The apparatus of claim 1, wherein the slave device is configured to deny the first request if the the storage and the queue indicate that the first master device is not the least recently served of two or more master devices that have had a request denied.

10. An apparatus comprising:
a slave device configured to receive a request from a first master device via a bus, wherein the first master device is one of a plurality of master devices coupled to the bus;
a queue of a plurality of elements configured to indicate the order in which the slave device has granted at least one previous request;
a retry pool comprising a plurality of positions configured to indicate which of the plurality of master devices have had a previous request denied by the slave device; and
an acceptor circuit configured to grant the request based upon the queue and the retry pool, wherein the acceptor circuit is configured to grant a request to a requesting master device if the queue and the retry pool indicate that the requesting master device is a least recently served master device of one or more of the plurality of master devices that have had a previous request denied by the slave device.

11. The apparatus of claim 10, wherein the plurality of positions in the retry pool each comprise a storage element.

12. The apparatus of claim 11, wherein the acceptor circuit is configured to set the storage elements to indicate which of the plurality of master devices has been denied a previous request.

13. The apparatus of claim 12, wherein the acceptor circuit is configured to grant the request if the storage elements in the retry pool indicate that none of the plurality of master devices has had a request denied by the slave device.

14. The apparatus of claim 13, wherein the acceptor circuit is adapted to deny the request if the first master device is not the least recently served of the master devices that have had requests denied by the slave device, as indicated by the plurality of elements in the queue and the plurality of positions in the retry pool.

15. A method comprising:
receiving a request from one of a plurality of master devices;
accessing a retry pool comprising a plurality of storage elements, wherein the storage elements are adapted to indicate which of the plurality of master devices have made at least one denied request;
accessing a queue comprising a plurality of elements adapted to indicate the order in which the plurality of master devices have made at least one granted request;
determining whether to grant the request based upon the queue and the retry pool, wherein the request is granted if the retry pool and the queue indicate that the one of the plurality of master devices is a least recently served master device that made a previously denied request; and
notifying the queue and the retry pool once the request has been granted or denied.

16. The method of claim 15, wherein accessing the retry pool comprises examining the storage elements in the retry pool to determine if at least one of the plurality of master devices has made at least one denied request.

17. The method of claim 16, wherein accessing the queue comprises determining if the request is being made by the least recently served of the master devices that made at least one denied request.

18. The method of claim 17, wherein determining whether to grant or deny the first request comprises granting the request if the storage elements in the retry pool indicate that none of the plurality of master devices have made at least one denied request.

19. The method of claim 18, wherein determining whether to grant or deny the first request comprises denying the request if the first request is not being made by the least recently served of the master devices that made at least one denied request.

20. The method of claim 19, wherein notifying the queue and the plurality of positions once the request has been granted or denied comprises notifying the queue if the request is granted.

21. The method of claim 20, wherein notifying the queue and the plurality of positions once the request has been granted or denied comprises notifying the plurality of positions if the request is denied.

22. A system comprising:
a plurality of master devices; and
a slave device coupled to each of the plurality of master devices, wherein the slave device includes:
a first storage configured to store ordering information indicative of an order in which at least some of the plurality of master devices were granted requests for service by the slave; and
a second storage configured to store retry information indicative of which of the plurality of master devices were denied a previous request for service by the slave;
wherein the slave device is configured to cause a current request to be arbitrated based upon the ordering information and the retry information.

23. The system as recited in claim 22, wherein the slave device is configured to grant the current request if a one of the plurality of master devices making the current request is a least recently served one among the plurality of master devices that were denied a previous request by the slave.

24. The system as recited in claim 22, wherein the slave device is configured to grant the current request if the retry information indicates that none of the plurality of master devices has had a previous request denied.

25. The system as recited in claim 22, wherein the slave device is configured to deny the current request if a one of the plurality of master devices making the current request is not a least recently served among the plurality of master devices that have had a previous request denied by the slave.

26. The system as recited in claim 25, wherein, responsive to denying the current request, the slave device is configured to provide information to the second storage indicating that the one of the plurality of master devices making the current request has had a previous request denied.

27. The system as recited in claim 22, wherein in response to receiving a request, the slave device is configured to determine if any of the plurality of master devices has had a previous request denied as indicated by the retry information.

28. The system as recited in claim 27, wherein the slave device is configured to determine if a master device making the request is a least recently served one of the plurality of master devices, as indicated by the ordering information.

29. The system as recited in claim 28, wherein the slave device is configured to determine if the least recently served one of the plurality of master devices has had a previous request denied if the master device making the request is not the least recently served one of the plurality of master devices.

30. The system as recited in claim 29, wherein the slave device is configured to determine if another one of the plurality of master devices corresponding to a next entry in the ordering information has had a previous request denied if the least recently served one of the plurality of master devices did not have a previous request denied as indicated by the retry information.

* * * * *